UNITED STATES PATENT OFFICE.

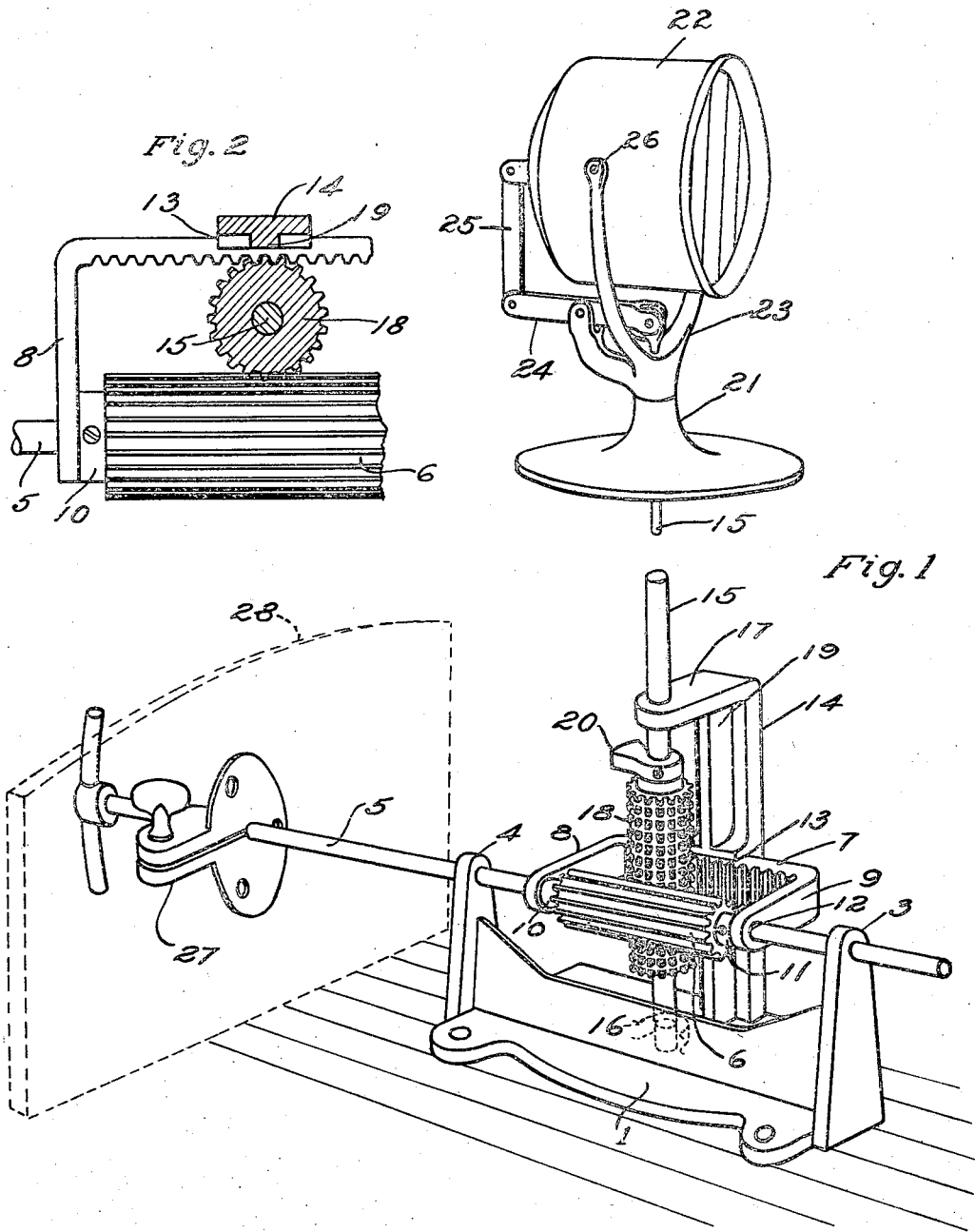

FREDERICK C. KAINER, OF CHICAGO, ILLINOIS.

RACK-AND-PINION DEVICE.

1,178,017.  Specification of Letters Patent.  Patented Apr. 4, 1916.

Application filed September 11, 1914. Serial No. 861,241.

*To all whom it may concern:*

Be it known that I, FREDERICK C. KAINER, a citizen of the United States of America, and a resident of Chicago, county of Cook, and State of Illinois, have invented certain new and useful Improvements in Rack-and-Pinion Devices, of which the following is a specification.

The main object of this invention is to provide an improved form of gearing and in particular to provide a gearing or mechanical movement arranged for the separate or simultaneous transmission of angular and lineal movements to facilitate the operation of devices requiring a compound movement in their operation, and the invention is adapted for a wide variety of uses, such as the sighting of searchlights, guns, telescopes, etc.

An illustrative embodiment of this invention is shown in the accompanying drawings, in which—

Figure 1 is a perspective view of the improved device with connections for operating a searchlight, the latter being shown on a reduced scale. Fig. 2 is a fragmentary sectional view taken on a horizontal plane through the gear 18.

The device comprises a frame 1 which is shown horizontally disposed in the drawing and is provided with bearings 3 and 4 in which a rod 5 is slidably and rotatably mounted. The rod 5 carries fast a comparatively wide gear or fluted cylinder 6. A rack 7 in the form of a yoke is also carried by shaft 5 in its longitudinal movement, but the shaft may rotate with respect to the rack 7 as it engages therewith at the arms 8 and 9 by the hubs 10 and 11 of gear 6 and passes through holes 12 in arms 8 and 9 to be freely rotatable therein.

The rack 7 is guided in its movement in a way 13 cut transversely on the inner face of a standard 14 extending vertically from the base of frame 1. A vertically disposed shaft 15 is slidably and rotatably mounted in a boss 16 of the frame and an arm 17 of upright 14. The shaft 15 carries fast a gear or cylindrical rack 18 having a comparatively wide face, but differing from ordinary spur gears in that its teeth are arranged in crossing annular and longitudinal rows and therefore it may at the same time serve both as a spur gear and a rack. Gear 18 is located between and meshes with both the teeth on gear 6 and the teeth of rack 7.

Longitudinal movement of shaft 5 through the rack 7 carried thereby causes rotation of gear 18 and its shaft 15, whereas rotation of shaft 5 through the gear 6 carried thereon, by engagement with teeth on gear 18, causes the gear 18 and the shaft 15 to move lengthwise in the manner of a rack. In its longitudinal movement, gear 18 slides along the vertical teeth on rack 7, and when gear 18 is rotated by rack 7, its teeth slide with respect to the teeth on gear 6. The rotational and lineal movements of gear 18 may occur separately or simultaneously.

The upright 14 is provided with a flange or stop 19 extending lengthwise thereof for engagement with an arm 20 secured to shaft 15 in order to limit the rotation of shaft 15 in either direction in any longitudinal position thereof when the device is used in the connection shown in the drawing. An example of a device operated by the gearing is a searchlight shown rotatably mounted on a base 21, the lamp 22 being pivotally carried in the usual manner by a rotatable frame 23, supporting at its center a lever 24 having a link connection 25 with the rear of the lamp. Thus the lamp may be adjusted vertically on its pivots 26 by a longitudinal movement of shaft 15 and be swung horizontally by turning said shaft on its axis. The rod 5 is shown in Fig. 1 as passing through a clamp 27 which is secured to a wall or bulk-head 28 shown by dotted lines. By means of this clamp the shaft 5 may be retained in any angular or longitudinal setting.

In operating the device, the rotation of shaft 15 is effected by longitudinal movement of rod 5, in which case the gear 6 idly slides between the annular rows of teeth on gear 18, while the rack 7 engages the longitudinal rows of teeth on gear 18, rotating the same and shaft 15, thus adjusting the searchlight horizontally around the axis of shaft 15. By rotating shaft 5, gear 6 engages the annular rows of teeth on gear 18, shifting the latter as a rack in a longitudinal direction while its teeth slide transversely across the face of rack 7. The shaft 5 may be rotated and reciprocated simultaneously to bring the searchlight directly to the desired position, the gear being suitable for transmitting such compound motion in that both a sliding and rolling motion may take place either between the gear 6 and the gear 18, or the gear 18 and rack 7. Thus this mechanism permits gear 18 to slide longitudinally while it is rotating.

Although but one specific embodiment of this invention has been herein shown and described, it will be understood that numerous details of the construction shown may be altered or omitted without departing from the spirit of this invention as defined by the following claims.

I claim:—

1. A cylindrical gear and rack member having crossing annular and longitudinal rows of teeth on its face, means intermeshing therewith for simultaneously imparting rotational and longitudinal motion to said member, and a device mounted for universal angular adjustment connected for adjustment with said member.

2. A cylindrical gear and rack member having crossing annular and longitudinal rows of teeth on its face, toothed members arranged to engage the teeth of said cylindrical member for imparting rotational and longitudinal motion thereto, and a device mounted for universal angular adjustment connected for adjustment with said cylindrical member.

3. In a device of the class described, the combination with a cylindrical gear having angular and longitudinal rows of teeth, a supporting device for said gear permitting both longitudinal and rotational movement thereof, a rack meshing with and extending transversely of said gear, and a gear or pinion having a comparatively wide face also meshing with said other gear and mounted to be movable with said rack but rotatable independently thereof.

4. In a device of the class described, the combination with a cylindrical gear having annular and longitudinal rows of teeth, a supporting device for said gear permitting both longitudinal and rotational movement thereof, a rack meshing with and extending transversely of said gear, and a wide faced gear or pinion meshing with said gear on the opposite side from said rack and mounted to be longitudinally movable with said rack but rotatable independently thereof.

5. In a device of the class described, a suitable support, a shaft mounted to reciprocate and rotate in said support, a wide faced gear secured to said shaft, a yoke carried by said shaft to move longitudinally therewith but permit the independent rotation of the shaft, said yoke being provided with rack teeth extending transversely to the teeth on said gear and located opposite said gear, a gear between said first mentioned gear and the rack and meshing with both said gear and rack and having annular and longitudinal rows of teeth, and a support for said last mentioned gear permitting rotational and longitudinal movements thereof.

6. In a device of the class described, a support, a pair of shafts extending at right angles to each other and each mounted to rotate and reciprocate in said support, a gear carried by one of said shafts and having annular and longitudinal rows of teeth, a wide faced gear and a rack carried by the other of said shafts, said wide faced gear and rack meshing with said first mentioned gear at opposite sides of its face.

7. In a device of the class described, a support, a pair of shafts extending at right angles to each other and each mounted to rotate and reciprocate in said support, a gear carried by one of said shafts and having annular and longitudinal rows of teeth, a wide faced gear and a rack carried by the other of said shafts, said wide faced gear and rack meshing with said first mentioned gear at opposite sides of its face, said rack being wider than the spaces between the annular rows of teeth on said first mentioned gear.

8. In a device of the class described, a support, a pair of shafts extending at right angles to each other and each mounted to rotate and reciprocate in said support, a gear carried by one of said shafts and having annular and longitudinal rows of teeth, a wide faced gear and a rack carried by the other of said shafts, said wide faced gear and rack meshing with said first mentioned gear at opposite sides of its face, and means for limiting the rotation of the gear having the annular and longitudinal rows of teeth.

9. In a device of the class described, a support, a pair of shafts extending at right angles to each other and each mounted to rotate and reciprocate in said support, a gear carried by one of said shafts and having annular and longitudinal rows of teeth, a wide faced gear and a rack carried by the other of said shafts, said wide faced gear and rack meshing with said first mentioned gear at opposite sides of its face, and means for limiting the rotation of the gear having the annular and longitudinal rows of teeth, said means comprising a shoulder on said support and an arm rigid with said gear for the purpose of limiting the rotation of the gear in any of its longitudinal positions.

10. In a device of the class described, a support, a pair of shafts extending at right angles to each other and each mounted to rotate and reciprocate in said support, a gear carried by one of said shafts and having annular and longitudinal rows of teeth, a wide faced gear and a rack carried by the other of said shafts, said wide faced gear and rack meshing with said first mentioned gear at opposite sides of its face, and a fixed clamp for engaging and locking one of said shafts in any position thereof.

11. A machine element for receiving or transmitting compound motions, comprising a member having a surface provided with crossed rows of gear teeth, means intermeshing therewith for simultaneously imparting rotational and longitudinal motion to said member, and a device mounted for universal angular adjustment connected for adjustment with said member.

Signed at Chicago this 8th day of September 1914.

FREDERICK C. KAINER.

Witnesses:
 EUGENE A. RUMMLER,
 M. IRENE HUTCHINGS.